(12) United States Patent
Hayashi et al.

(10) Patent No.: US 8,077,293 B2
(45) Date of Patent: Dec. 13, 2011

(54) SURVEYING DEVICE AND SURVEYING SYSTEM

(75) Inventors: Kunihiro Hayashi, Itabashi-ku (JP);
Fumio Ohtomo, Itabashi-ku (JP);
Kaoru Kumagai, Itabashi-ku (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 332 days.

(21) Appl. No.: 12/381,872

(22) Filed: Mar. 17, 2009

(65) Prior Publication Data
US 2009/0235543 A1    Sep. 24, 2009

(30) Foreign Application Priority Data

Mar. 21, 2008   (JP) ................................ 2008-074434

(51) Int. Cl.
*G01C 3/08* (2006.01)
(52) U.S. Cl. ...... 356/3.03; 356/3.01; 356/3.1; 356/3.15; 356/4.01; 356/4.1
(58) Field of Classification Search ......... 356/3.01–28.5
See application file for complete search history.

(56) References Cited

U.S. PATENT DOCUMENTS

| | | | | |
|---|---|---|---|---|
| 5,745,050 A * | 4/1998 | Nakagawa | ................. | 340/903 |
| 5,923,468 A | 7/1999 | Tsuda et al. | ................. | 359/426 |
| 6,411,371 B1 | 6/2002 | Hinderling et al. | .......... | 356/4.01 |
| 6,879,384 B2 | 4/2005 | Riegl et al. | ................. | 356/5.01 |
| 6,881,926 B2 | 4/2005 | Ohtomo et al. | .......... | 219/121.73 |
| 7,110,102 B2 | 9/2006 | Ohtomo et al. | ............. | 356/141.4 |
| 7,382,443 B2 | 6/2008 | Ohtomo et al. | ............. | 356/4.01 |
| 7,474,388 B2 | 1/2009 | Ohtomo et al. | ............. | 356/4.07 |
| 2002/0012114 A1 | 1/2002 | Shirai et al. | ................. | 356/3 |
| 2003/0090646 A1* | 5/2003 | Riegl et al. | ................. | 356/3 |
| 2004/0107589 A1 | 6/2004 | Ohtomo et al. | ................. | 33/290 |
| 2005/0211882 A1* | 9/2005 | Ohtomo et al. | ................. | 250/221 |
| 2009/0002678 A1* | 1/2009 | Tanaka et al. | ................. | 356/4.01 |

FOREIGN PATENT DOCUMENTS

| | | |
|---|---|---|
| EP | 1 380 812 | 1/2004 |
| EP | 1 434 029 | 6/2004 |
| EP | 1 801 538 | 6/2007 |
| JP | 2004-212058 | 7/2004 |
| JP | 2006-337302 | 12/2006 |

OTHER PUBLICATIONS

European communication dated Jul. 14, 2009.

* cited by examiner

*Primary Examiner* — Thomas Tarcza
*Assistant Examiner* — Luke Ratcliffe
(74) *Attorney, Agent, or Firm* — Nields, Lemack & Frame, LLC

(57) ABSTRACT

The present invention provides a surveying device, which comprises rotators 53, 56 and 61 for deflecting a distance measuring light in horizontal direction and for projecting the distance measuring light in rotary irradiation, at least one extension member 62 for increasing a spreading angle in vertical direction of the distance measuring light, and a means for attaching or detaching the extension member so that the extension member can be inserted and removed to or from a distance measuring optical axis.

16 Claims, 7 Drawing Sheets

SURVEYING DEVICE AND SURVEYING SYSTEM

BACKGROUND OF THE INVENTION

The present invention relates to a surveying device and a surveying system when a surveying operation is performed by a single surveying operator or by cooperation of two or more surveying operators.

In a surveying operation performed in a civil engineering work, e.g. a surveying operation in a road construction, a measurement is performed on positions on both sides of the road, on a difference in elevation, on a width of the road, etc., and a plurality of measuring points are measured at the same time. As a result, the surveying operation is a cooperative operation to be performed by two or more surveying operators.

A surveying device, by which measurement can be made on a plurality of measuring points at the same time, is disclosed in JP-A-2006-337302.

In a surveying device according to JP-A-2006-337302, laser beams for forming reference plane including three or more fan-shaped laser beams, with at least one of the laser beams being tilted, are projected in rotary irradiation, and the reference plane is formed. Further, an elevation angle is measured according to a time difference when a photodetection unit of a side of an object to be measured receives a plurality of fan-shaped laser beams. Also, by receiving a reflected laser beam from the object to be measured, a horizontal angle is measured from a projecting direction of the fan-shaped laser beam at the moment when the reflected laser beam is received. Further, the surveying device projects a distance measuring light, which are spread in vertical direction, in rotary irradiation. Then, the reflected distance measuring light from the object to be measured is received, and an electro-optical distance measurement is performed on a distance to the object to be measured. A position in vertical direction of the object to be measured is calculated based on an elevation angle and the measured distance, and a three-dimensional position of the object to be measured is measured.

By the surveying device as described above, measurement can be performed at the same time on a plurality of objects to be measured (hereinafter referred as "multi-measurement), which are present within a projecting range of the fan-shaped laser beam and of the distance measuring light, by projecting the fan-shaped laser beams and the distance measuring light spread in vertical direction in rotary irradiation, i.e. on a plurality of objects to be measured which are present within total circumference in horizontal direction and within the range of spreading in vertical direction of these two types of laser beams.

By the surveying device as described above, the distance measuring light spread in vertical direction are projected in rotary irradiation. Then, the reflected light from the objects to be measured are received, and the electro-optical distance measurement is performed. As a result, an optical intensity of each of the distance measuring light is decreased, and influence of noise light becomes stronger, and this leads to lower measurement accuracy. Further, because the distance measuring light is rotated at high velocity, a measuring time of one measurement is short. Also, there are not many distance measurement data to be averaged, and it is not possible to improve the measurement accuracy. For the purpose of improving the measurement accuracy, the light must be projected in rotary irradiation many times, longer time is required for the measurement, and a working efficiency is decreased.

Further, because the distance measuring light is spread in vertical direction, an optical intensity of the received light is decreased more when the distance to be measured is longer. Thus, these are a problem that the distance which can be measured is lengthen, and other problems.

A total station is known as a means, by which measurement can be made to a measuring point with higher accuracy. The total station has a tracking function. For instance, similarly to the case of design-based surveying operation, a surveying operator moves an object to be measured (prism) to each of the measuring points. The total station tracks each object to be measured and performs the measurement on each of the measuring points.

The total station with tracking function can be operated by one operator (one-man operated measurement). The measurement can be made with high accuracy and a working efficiency of the measurement is also high, but it is not possible to perform measurements at a multiple points at the same time. As a result, in case it is necessary to perform measurements on a multiple points at the same time, the working efficiency is extremely decreased.

JP-A-2004-212058 discloses a method, by which two or more fan-shaped laser beams, with at least one fan-shaped laser beam being tilted, are projected in rotary irradiation, a horizontal reference plane is formed, and an elevation angle with respect to the horizontal reference plane is determined from a tilt angle of the tilted fan-shaped laser beam.

SUMMARY OF THE INVENTION

It is an object of the present invention to provide a surveying device and a surveying system, by which it is possible to perform multi-measurement on a multiple points at the same time, and also to perform one-man operated measurement, and further, to accomplish the measurement with high accuracy.

To attain the above object, the present invention provides a surveying device, which comprises a rotator for a deflecting distance measuring light in horizontal direction and for projecting the distance measuring light in rotary irradiation, at least one extension member for increasing a spreading angle in vertical direction of the distance measuring light, and a means for attaching or detaching the extension member so that the extension member can be inserted and removed to or from a distance measuring optical axis.

Also, the present invention provides the surveying device as described above, wherein the rotator has an elevation rotary mirror for deflecting the distance measuring optical axis in horizontal direction, the elevation rotary mirror is rotatable around a horizontal axis, the elevation rotary mirror has a plurality of reflection surfaces, at least one extension member is disposed opposite to one surface of the elevation rotary mirror and is rotatable integrally with the elevation rotary mirror, and when the distance measuring optical axis is deflected by one surface of the elevation rotary mirror, the distance measuring light pass through the extension member. Further, the present invention provides the surveying device as described above, wherein the rotator has the elevation rotary mirror for deflecting the distance measuring optical axis in horizontal direction, and the distance measuring light is projected via an optical path where at least one of the extension members is provided to allow the distance measuring light to pass through. Also, the present invention provides the surveying device as described above, wherein the elevation rotary mirror is rotated around the horizontal axis, and an optical path is selected where the distance measuring light is projected. Further, the present invention provides the surveying device as described above, wherein the extension member is held by an extension member holding unit with respect to the elevation rotary mirror, the extension member holding unit is rotated around an elevation axis, and an optical path is selected where the distance measuring light is projected.

Also, the present invention provides a surveying device, which comprises a light source for emitting distance measuring light, a distance measuring light projecting unit for projecting the distance measuring light from the light source as a spot-type distance measuring light or as a fan-shaped distance measuring light toward a space where an object to be measured is present, a fan-shaped beam rotary projecting unit for projecting two or more fan-shaped beams, with at least one fan-shaped beam being tilted, in rotary irradiation, a horizontal angle detecting unit for detecting a horizontal angle in a projecting direction of the fan-shaped beams or the distance measuring light, an elevation angle detecting unit for detecting an elevation angle in a projecting direction of the spot-type distance measuring light or for detecting an elevation angle by a fan-shaped beam receiving unit, a distance measuring unit for measuring a distance to the object to be measured by receiving a reflected distance measuring light from the object to be measured, a reflected fan-shaped beam receiving unit for receiving a reflection light of the fan-shaped beams reflected from the object to be measured, a distance measuring light switchover unit for selecting one of the spot-type distance measuring light or the fan-shaped distance measuring light projected from the distance measuring light projecting unit, and an arithmetic unit for calculating a three-dimensional position of the object to be measured based on a result of the distance measurement by the distance measuring unit, on a result of detection by the horizontal angle detecting unit, and on a result of detection by the elevation angle detecting unit. Further, the present invention provides the surveying device as described above, wherein the projecting light switchover unit has an extension member for increasing a spreading angle in vertical direction of the distance measuring light and a means for inserting and removing the extension member for attaching or detaching the extension member to or from a distance measuring optical axis. Also, the present invention provides the surveying device as described above, wherein the extension member is a lenticular lens. Further, the present invention provides the surveying device as described above, wherein the extension member is a grating member. Also, the present invention provides the surveying device as described above, wherein, when the extension member is removed, the elevation rotary mirror is rotated further in vertical direction and deflects the distance measuring optical axis. Further, the present invention provides the surveying device as described above, wherein the extension member can be selected from a plurality of extension members with different spreading angles in vertical direction of the distance measuring light.

Also, the present invention provides a surveying system, which comprises a surveying device and an object to be measured, wherein the surveying device comprises a distance measuring light projecting unit for projecting a spot-type distance measuring light or a fan-shaped distance measuring light toward an object to be measured, a distance measuring light projecting direction detecting unit for detecting a projecting direction by the distance measuring light projecting unit, a distance measuring light receiving unit for receiving the spot-type distance measuring light or the fan-shaped distance measuring light reflected from the object to be measured, a fan-shaped beam rotary projecting unit for projecting two or more fan-shaped beams, with at least one fan-shaped beam being tilted, in rotary irradiation, a fan-shaped beam projecting direction detecting unit for detecting a projecting direction of the fan-shaped beams, a first communication unit, a distance measuring light switchover unit for switching over the spot-type distance measuring light and the fan-shaped distance measuring light, and wherein the object to be measured comprises an arithmetic unit, a reflector for reflecting the distance measuring light projected from the distance measuring light projecting unit, a fan-shaped beam receiving unit for receiving the fan-shaped beams from the fan-shaped beam rotary projecting unit, and a second communication unit for performing a communication by giving and taking a signal including a signal from the fan-shaped beam receiving unit to and from the first communication unit, wherein the arithmetic unit calculates a three-dimensional position of the object to be measured based on signals from the distance measuring light projecting direction detecting unit and from the distance measuring light receiving unit when the spot-type distance measuring light is selected, and wherein the arithmetic unit calculates the three-dimensional position of the object to be measured based on signals from the fan-shaped beam projecting direction detecting unit and/or the distance measuring light projecting direction detecting unit, on a signal from the distance measuring light receiving unit, and on a signal from the second communication unit, which is received at the first communication unit.

Further, the present invention provides the surveying system as described above, wherein the projecting light switchover unit comprises an extension member for increasing a spreading angle in vertical direction of the distance measuring light and a means for inserting and removing the extension member to or from a distance measuring optical axis. Also, the present invention provides the surveying system as described above, wherein the extension member is a lenticular lens. Further, the present invention provides the surveying system as described above, wherein the extension member is a grating member.

The present invention provides a surveying device, which comprises a rotator for deflecting a distance measuring light in horizontal direction and for projecting the distance measuring light in rotary irradiation, at least one extension member for increasing a spreading angle in vertical direction of the distance measuring light, and a means for attaching or detaching the extension member so that the extension member can be inserted and removed to or from a distance measuring optical axis. As the distance measuring light, the fan-shaped distance measuring light with the spreading angles in vertical direction, the spot-type distance measuring light with luminous flux running in parallel, or the fan-shaped distance measuring light with a different spreading angle can be selected and projected. As a result, it is possible to select an aspect of an electro-optical measurement, and an applicability of the surveying device is increased.

Also, the present invention provides the surveying device as described above, wherein the rotator has an elevation rotary mirror for deflecting the distance measuring optical axis in horizontal direction, the elevation rotary mirror is rotatable around a horizontal axis, the elevation rotary mirror has a plurality of reflection surfaces, at least one extension member is disposed opposite to one surface of the elevation rotary mirror and is rotatable integrally with the elevation rotary mirror, and when the distance measuring optical axis is deflected by one surface of the elevation rotary mirror, the distance measuring light passes through the extension member. As a result, the surveying device is in a simple construction and the distance measuring light can be projected by selecting from the fan-shaped distance measuring light with spreading angle in vertical direction, the spot-type distance measuring light with parallel beams or the fan-shaped distance measuring light with a different spreading angle.

Further, the present invention provides the surveying device as described above, wherein the rotator has the elevation rotary mirror for deflecting the distance measuring optical axis in horizontal direction, and the distance measuring light is projected via an optical path where at least one of the extension members is provided to allow the distance measuring light to pass through. As a result, the surveying device is in a simple construction and the distance measuring light can be projected by selecting from the fan-shaped distance measuring light with spreading angle in vertical direction, the spot-type distance measuring light with parallel beams or the fan-shaped distance measuring light with a different spreading angle.

Also, the present invention provides the surveying device as described above, wherein a light source for emitting distance measuring light, a distance measuring light projecting unit for projecting the distance measuring light from the light source as a spot-type distance measuring light or as a fan-shaped distance measuring light toward a space where an object to be measured is present, a fan-shaped beam rotary projecting unit for projecting two or more fan-shaped beams, with at least one fan-shaped beam being tilted, in rotary irradiation, a horizontal angle detecting unit for detecting a horizontal angle in a projecting direction of the fan-shaped beams or the distance measuring light, an elevation angle detecting unit for detecting an elevation angle in a projecting direction of the spot-type distance measuring light or for detecting an elevation angle by a fan-shaped beam receiving unit, a distance measuring unit for measuring a distance to the object to be measured by receiving a reflected distance measuring light from the object to be measured, a reflected fan-shaped beam receiving unit for receiving a reflection light of the fan-shaped beam reflected from the object to be measured, a distance measuring light switchover unit for selecting one of the spot-type distance measuring light or the fan-shaped distance measuring light projected from the distance measuring light projecting unit, and an arithmetic unit for calculating a three-dimensional position of the object to be measured based on a result of the distance measurement by the distance measuring unit, on the result of detection by the horizontal angle detecting unit, and on the result of detection by the elevation angle detecting unit. As a result, it is possible to select an aspect of an electro-optical measurement, and an applicability of the surveying device is increased.

Further, the present invention provides the surveying device as described above, wherein the projecting light switchover unit has an extension member for increasing a spreading angle in vertical direction of the distance measuring light and a means for attaching or detaching the extension member for inserting and removing the extension member to or from a distance measuring optical axis. As a result, the surveying device is in a simple construction and the distance measuring light can be projected by selecting from the fan-shaped distance measuring light with spreading angle in vertical direction, the spot-type distance measuring light with parallel beams, or the fan-shaped distance measuring light with different spreading angle.

Also, the present invention provides the surveying system as described above, comprising a surveying device and an object to be measured, wherein the surveying device comprises a distance measuring light projecting unit for projecting a spot-type distance measuring light or a fan-shaped distance measuring light toward an object to be measured, a distance measuring light projecting direction detecting unit for detecting a projecting direction by the distance measuring light projecting unit, a distance measuring light receiving unit for receiving the spot-type distance measuring light or the fan-shaped distance measuring light reflected from the object to be measured, a fan-shaped beam rotary projecting unit for projecting two or more fan-shaped beams, with at least one fan-shaped beam being tilted, in rotary irradiation, a fan-shaped beam projecting direction detecting unit for detecting a projecting direction of the fan-shaped beams, a first communication unit, a distance measuring light switchover unit for switching over the spot-type distance measuring light and the fan-shaped distance measuring light, and wherein the object to be measured comprises an arithmetic unit, a reflector for reflecting the distance measuring light projected from the distance measuring light projecting unit, a fan-shaped beam receiving unit for receiving the fan-shaped beams from the fan-shaped beam rotary projecting unit, and a second communication unit for performing a communication by giving and taking a signal including a signal from the fan-shaped beam receiving unit to and from the first communication unit, wherein the arithmetic unit calculates a three-dimensional position of the object to be measured based on signals from the distance measuring light projecting direction detecting unit and from the distance measuring light receiving unit when the spot-type distance measuring light is selected, and wherein the arithmetic unit calculates the three-dimensional position of the object to be measured based on signals from the fan-shaped beam projecting direction detecting unit and/or the distance measuring light projecting direction detecting unit, on a signal from the distance measuring light receiving unit, and on a signal from the second communication unit, which is received at the first communication unit. As a result, it is possible to select an aspect of electro-optical measurement, and an applicability of the surveying device is increased.

Further, the present invention provides the surveying system as described above, wherein the projecting light switchover unit comprises an extension member for increasing a spreading angle in vertical direction of the distance measuring light and a means for inserting and removing the extension member to or from a distance measuring optical axis. As a result, the surveying device is in a simple construction and the distance measuring light can be projected by selecting from the fan-shaped distance measuring light with spreading angle in vertical direction, the spot-type distance measuring light with parallel beams or the fan-shaped distance measuring light with a different spreading angle.

THE BRIEF DESCRIPTION OF THE DRAWINGS

FIG. 6 is a schematical drawing to show an arrangement of a reference plane forming unit of the surveying device;

DETAILED DESCRIPTION OF THE PREFERRED EMBODIMENTS

A description will be given below on the best mode for carrying out the present invention by referring to the attached drawings.

First, referring to FIG. 1 and FIG. 2, a description will be given on general features of a surveying system in an embodiment of the present invention.

The surveying system comprises a surveying device 1 and at least one photodetection device 7. The surveying device 1 and the photodetection device 7 can give and take data to and from each other via a communication means.

Figure 1:
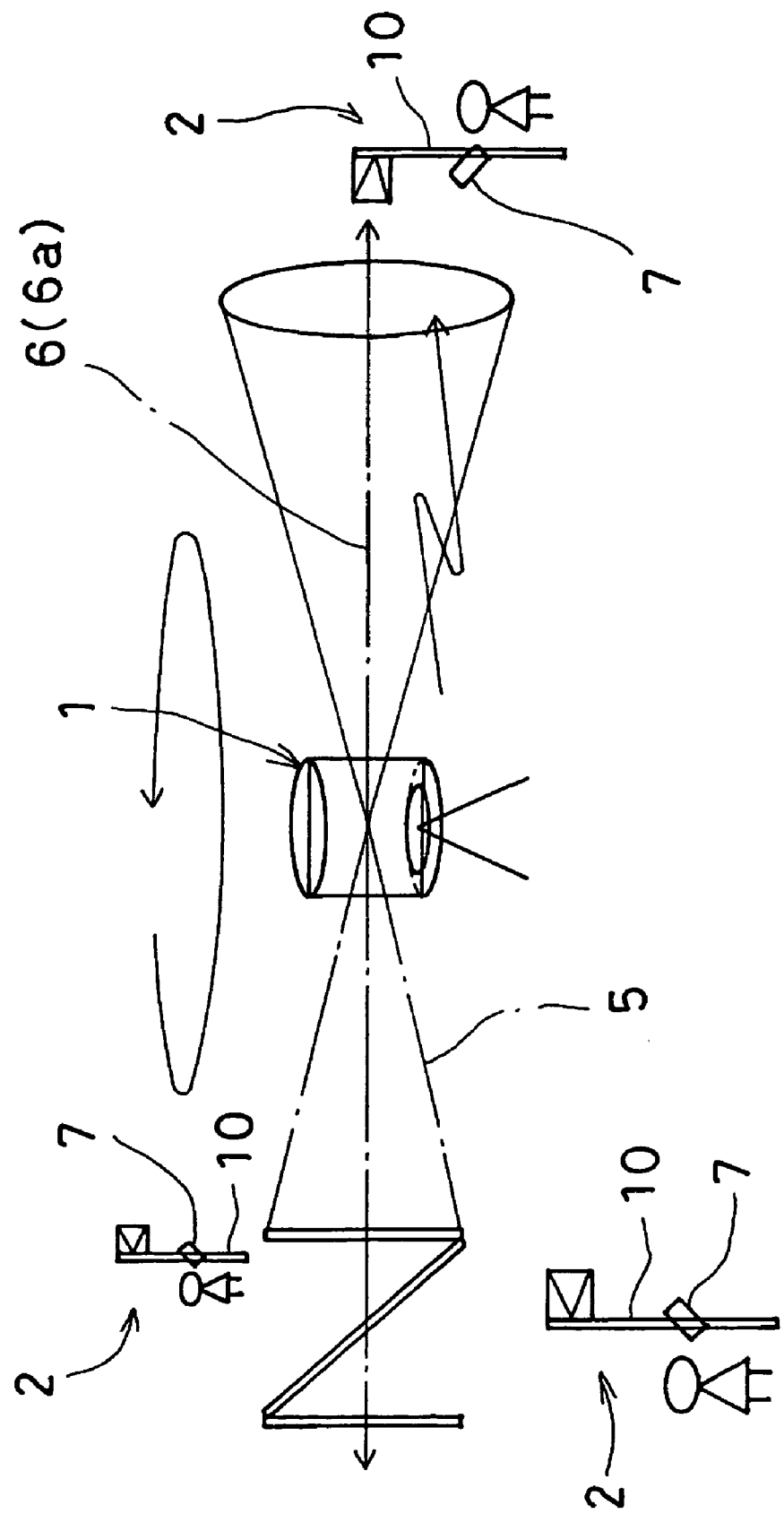
FIG. 1 is a schematical drawing of an embodiment of the present invention, showing a case where multi-measurement is performed.

FIG. 1 shows a case where the multi-measurement is performed by using the surveying device 1 and a plurality of objects 2 to be measured.

The surveying device 1 is installed at a known point via a tripod 8 and can project laser beams 5 for forming a reference plane at a constant velocity in rotary irradiation and can project distance measuring light 6 in rotary irradiation. Each of the objects 2 to be measured has the photodetection device 7, including a reflection prism, and a pole 10, and the photodetection device 7 is installed at a known height on the pole 10. The photodetection device 7 receives the laser beams projected from the surveying device 1 and reflects the laser beams to the surveying device 1.

The surveying device 1 can measure a distance to each of the photodetection devices 7 installed at a plurality of points by receiving the distance measuring light 6 reflected from the photodetection devices 7.

A reference plane forming unit 3 forms a horizontal reference plane by projecting the laser beams 5 for forming reference plane at constant velocity in rotary irradiation. The laser beams 5 for forming reference plane is made up of two or more fan-shaped laser beams, of which at least one beam is tilted at a known angle. (In the figure, the laser beams 5 is made up of three fan-shaped laser beams with cross-section of luminous fluxes in N-shaped form (hereinafter, may be referred as "fan-shaped beams")).

The surveying device 1 projects the laser beam 5 for forming reference plane in rotary irradiation. By obtaining the difference of time when the photodetection device 7 detects two or more fan-shaped laser beams, it is possible to determine an elevation angle with respect to the horizontal reference plane with the surveying device 1 at a center from the time difference and a tilt angle of the tilted fan-shaped laser beam. Based on the elevation angle, a tilting reference plane can be set. The surveying device 1 receives the elevation angle from the photodetection device 7, and a projecting direction of the fan-shaped laser beam is calculated by an encoder from the time when the elevation angle is received. Then, with the elevation angle data thus received, a horizontal angle of the photodetection device 7 is calculated. The elevation angle and the horizontal angle may be calculated based on the photodetection time when the surveying device receives the reflection light from the object 2 to be measured.

A distance measuring light projecting unit 4 projects the distance measuring light 6 in rotary irradiation. The distance measuring light 6 is fan-shaped distance measuring light 6a spread in vertical direction or is spot-type distance measuring light 6b which is luminous flux running approximately in parallel with small diameter. It is so designed that one of these types of light is selected and projected.

When the fan-shaped distance measuring light 6a are projected, the distance measuring light reflected from the objects 2 to be measured within the range of spreading are received, and the distances to the objects 2 to be measured are determined. By projecting the fan-shaped distance measuring light 6a in rotary irradiation, it is possible to measure a distance to each of the plurality of objects 2 to be measured at the same time. Also, from the elevation angle measured by the laser beams 5 for forming reference plane and from a distance measured by the fan-shaped distance measuring light 6a, it is possible to measure a position of each of the objects 2 to be measured in direction of height.

Figure 2:
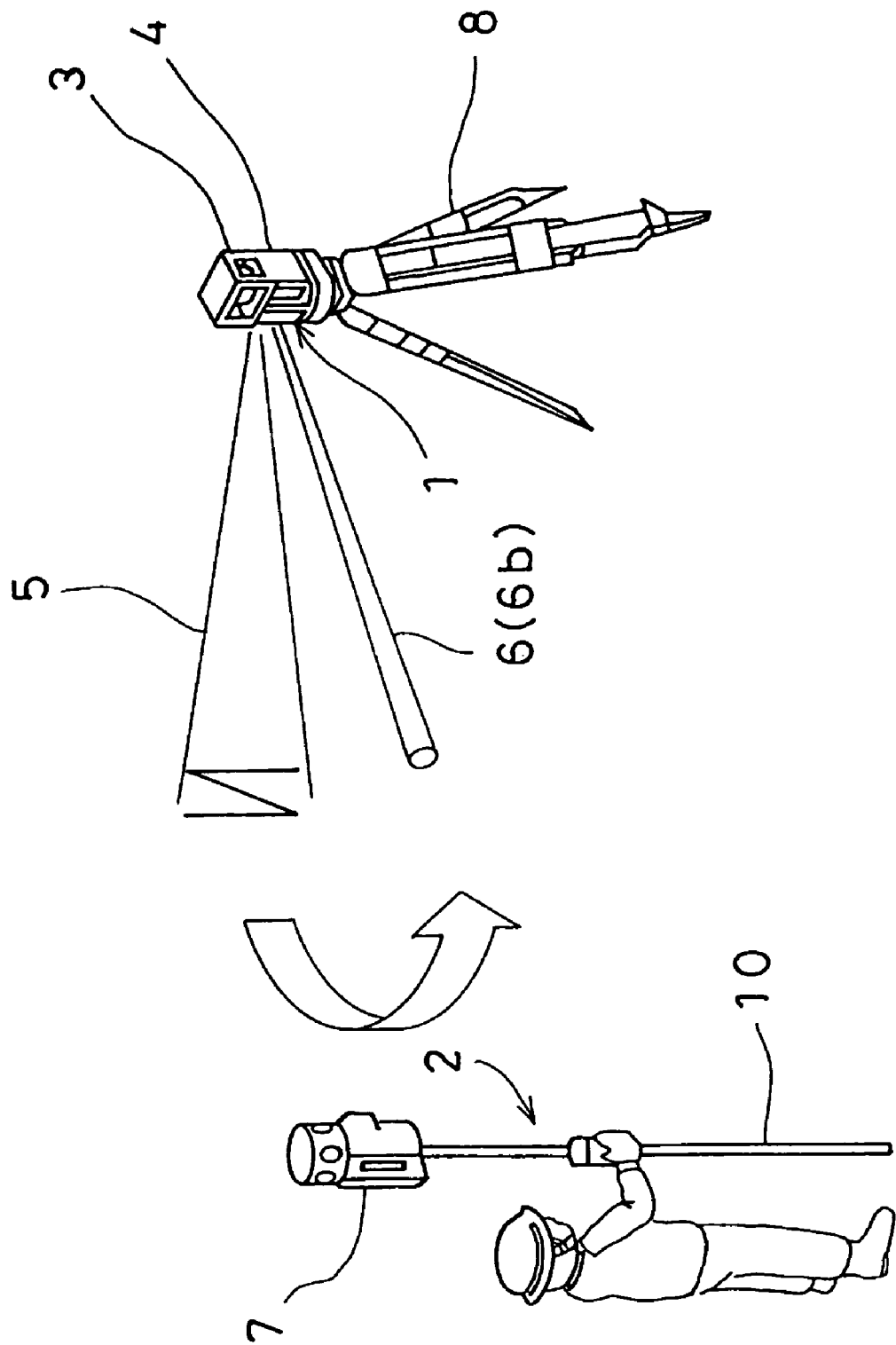
FIG. 2 is a schematical drawing of an embodiment of the present invention in a case where one-man operated measurement is performed.

FIG. 2 shows a case where one-man operated measurement is performed. When carrying out the one-man operated measurement, the spot-type distance measuring light 6b is projected from the distance measuring light projecting unit 4.

First, the laser beams 5 for forming reference plane are projected in rotary irradiation from the surveying device 1. The photodetection device 7 measures an elevation angle based on the difference of the photodetection time from each of two or more fan-shaped laser beams, and the result of the measurement is transmitted to the surveying device 1. When the data of the elevation angle is received from the photodetection device 7, the surveying device 1 calculates a projecting direction of the fan-shaped laser beams by an encoder from the time when the data has been received. Together with the data of the elevation angle thus received, a horizontal angle of the photodetection device 7 is calculated. It may be so designed that the elevation angle and the horizontal angle are calculated from photodetection time of the reflected lights from the objects 2 to be measured when the surveying device 1 receives the reflected lights.

From the horizontal angle and the elevation angle, a direction of the photodetection device 7 as seen from the surveying device 1 is determined, and the spot-type distance measuring light 6b is projected in the direction as determined. In this case, the distance measuring light is laser beam, which has small beam diameter and the beams are running approximately in parallel. When the spot-type distance measuring light 6b is projected to the photodetection device 7, and the distance measuring light reflected from the photodetection device 7 is received by the surveying device 1, the projection of the laser beams 5 for forming reference plane in rotary irradiation is stopped, and the measurement by tracking is started.

In case where the objects 2 to be measured could not be detected by the laser beams 5 for forming reference plane, the fan-shaped distance measuring light 6a or the spot-type distance measuring light 6b are continuously emitted, and the objects 2 to be measured may be searched by projecting the lights in rotary irradiation and by shifting the lights in vertical direction.

In the one-man operated measurement, the diameter of the distance measuring light 6 is small and the optical intensity is high. Accordingly, the influence from the noise light is low, and the distance measurement can be made on long distance. Because the measurement is performed while tracking the photodetection device 7, there is enough time for measurement, and the measurement accuracy is high.

As described above, according to the present invention, the fan-shaped distance measuring light 6a is projected with spreading angle in vertical direction in case of the multi-measurement, and the spot-type distance measuring light 6b with small beam diameter and narrow spreading is projected in case of the one-man operated measurement.

Figure 3:
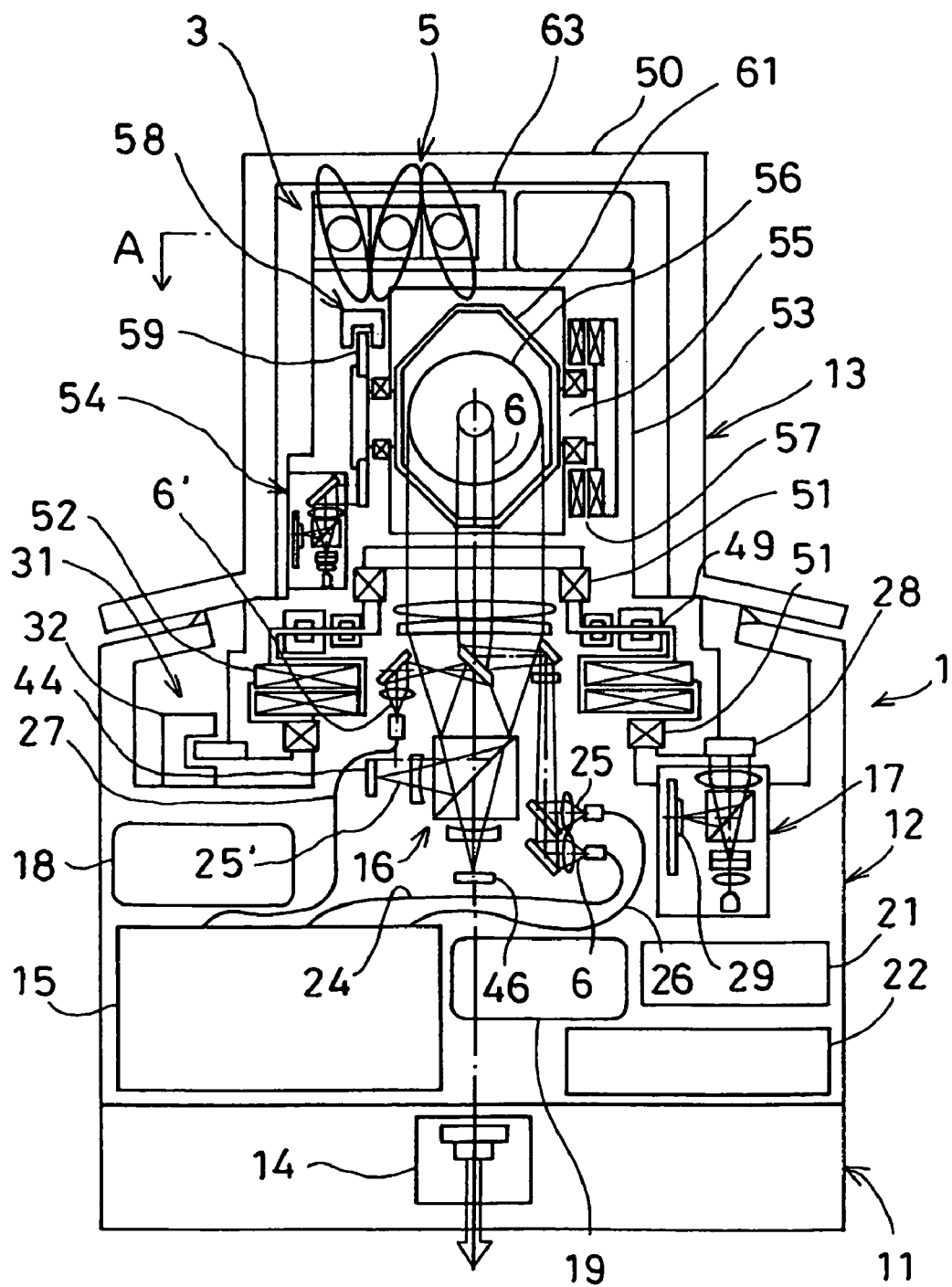
FIG. 3 is a schematical block diagram of a surveying device according to the present invention.

Now, referring to FIG. 3 to FIG. 5, a description will be given on a surveying device, by which it is possible to selectively project the distance measuring light 6 with different shapes of beams in case of the multi-measurement and in case of the one-man operated measurement.

The surveying device 1 primarily comprises a leveling unit 11, a main unit 12 mounted on a tripod 8 via the leveling unit 11, and a rotator 13, which is rotatably mounted on the main unit 12.

The leveling unit 11 is used to perform the leveling of the surveying device 1 and the leveling unit 11 has a point laser beam projecting unit 14, which projects laser beams downward in vertical direction. The position where the surveying device 1 is installed can be determined by a point on a ground surface where the point laser beam is projected.

A distance measuring unit 15, a distance measuring optical unit 16, an elevation rotation axis tilt detecting unit 17, a tilt sensor 10, a main unit controller 19, a communication unit 21, a power source 22, etc. are accommodated in the main unit 12.

The distance measuring unit 15 has a distance measuring light source (not shown), and a tracking light source (not shown). The distance measuring light 6 is projected from the distance measuring optical unit 16 via a first glass fiber 24, and a tracking light 25 is projected from the distance measuring optical unit 16 via a second glass fiber 26. A reflected distance measuring light 6' reflected from the object 2 to be measured is received via the distance measuring optical unit 16, and is guided toward the distance measuring unit 15 via a third glass fiber 27.

The distance measuring unit 15 performs the distance measurement by comparing the reflected distance measuring light 6' with an internal reference light (not shown), which is obtained by dividing the distance measuring light 6.

Tilting of the main unit 12 is detected by the tilt sensor 18. On a lower end of the rotator 13, a rotary ring 28, which is a reflection mirror, is provided, and the elevation rotation axis tilt detecting unit 17 is disposed at a position opposite to the rotary ring 28.

The elevation rotation axis tilt detecting unit 17 projects a detection light toward the rotary ring 28 and the detection light reflected by the rotary ring 28 is received by a photodetection sensor 29. A tilting of the rotary ring 28, i.e. a tilting of rotation axis of the rotator 13, is detected according to a deviation of a photodetecting position of the detection light on the photodetection sensor 29.

The rotary ring 28 also fulfills the function as a pattern ring of a horizontal angle detecting encoder 31. Based on a signal from a pattern detecting unit 32, a horizontal angle is detected. The horizontal angle detecting encoder 31 has a reference point, and serves as an absolute encoder, which can detect an angle from the reference point.

Now, referring to FIG. 5, a description will be given on the distance measuring optical unit 16.

Figure 5:
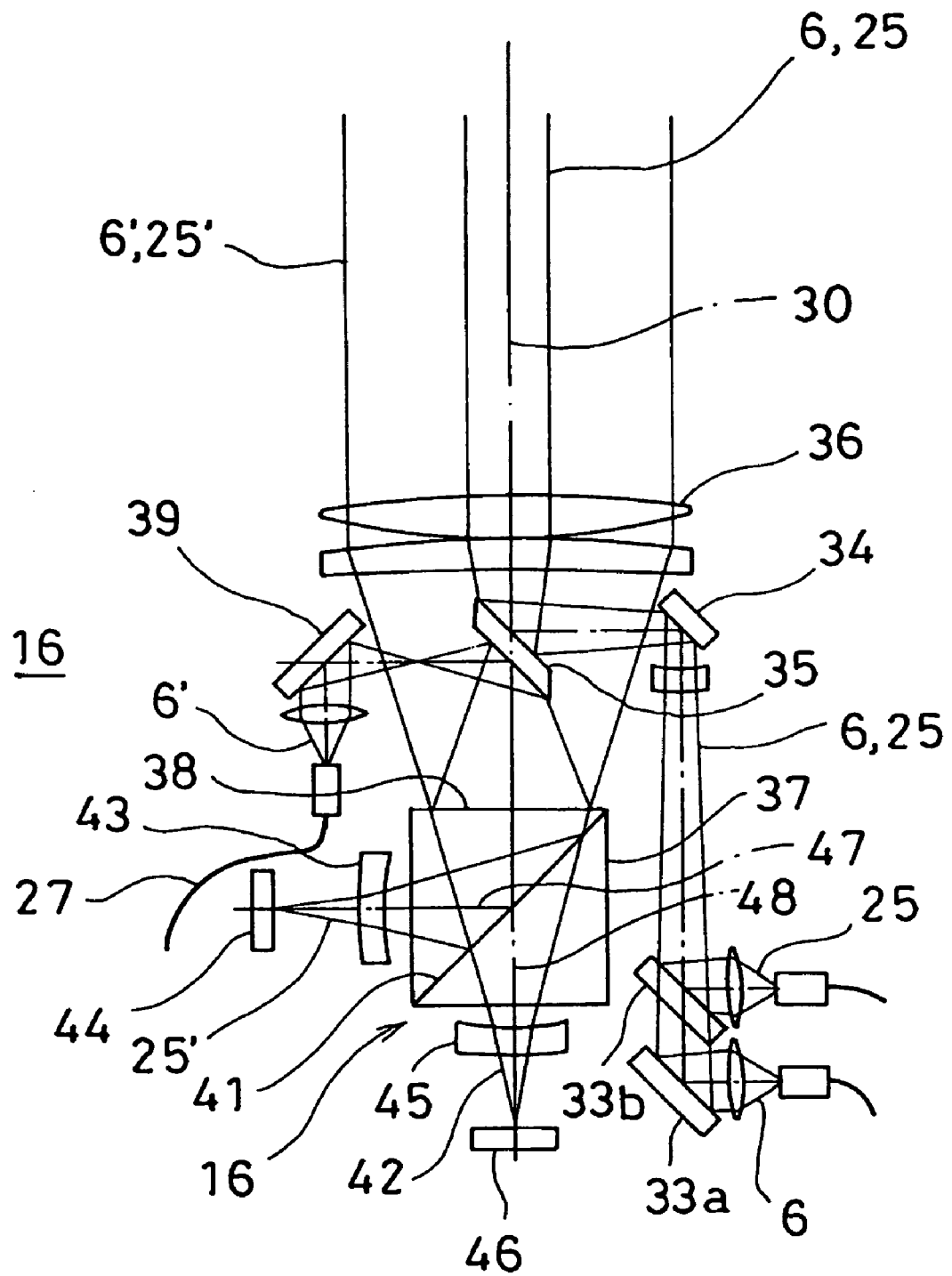
FIG. 5 is a schematical block diagram to show a distance measuring optical system of the surveying device.

In FIG. 5, reference numeral 30 denotes a distance measuring optical axis, and the distance measuring optical axis 30 concurs with the rotation axis of the rotator 13. A condenser lens 36, a mirror 35, and a beam splitter 37 are disposed on the distance measuring optical axis 30. A condenser lens 43 and a tracking light photodetection sensor 44 are disposed on a reflection light optical axis 47 from the beam splitter 37. A condenser lens 45 and an image photodetection sensor 46 are disposed on a transmission light optical axis 48 of the beam splitter 37.

The distance measuring light 6 is reflected by a mirror 33a, and the tracking light 25 is reflected by a mirror 33b along the same optical path as the optical path of the distance measuring light 6. The distance measuring light 6 has a wavelength different from the wavelength of the tracking light 25, and the mirror 33a is designed to form a reflection film so that the reflection film allows the distance measuring light 6 to pass and reflects the tracking light 25.

The distance measuring light 6 and the tracking light 25 are deflected by the mirror 34 and the mirror 35 and are projected along the distance measuring optical axis 30. The distance measuring light 6 and the tracking light 25 are turned to parallel luminous flux beams, which are then deflected in horizontal direction via the rotator 13 and are projected.

A reflected distance measuring light 6' as reflected by the object 2 to be measured enters the distance measuring optical unit 16 via the rotator 13. Then, the reflected distance measuring light 6' is converged by the condenser lens 36 and is reflected by an upper reflection surface 38 of the beam splitter 37. Further, the reflected distance measuring light 6' is reflected by the mirror 35 and the mirror 39 and enters the third glass fiber 27.

Of a reflected tracking light 25' and a visible light (natural light) 42, which passed through the upper reflection surface 38, the reflected tracking light 25' is reflected by an inner reflection surface 41. Then, the reflected tracking light 25' is converged by a condenser lens 43 and is received by a tracking light photodetection sensor 44. The visible light 42 passes through the inner reflection surface 41, is converged by a condenser lens 45, and is received by an image photodetection sensor 46.

On the upper reflection surface 38, a reflection film is formed, which reflects the reflected distance measuring light 6' and allows the reflected tracking light 25' and the visible light 42 to pass through. On the inner reflection surface 41, a reflection surface is formed, which reflects the reflected tracking light 25' and allows the visible light 42 to pass through.

As the tracking light photodetection sensor 44 and the image photodetection sensor 46, an aggregate of a multiple pixels such as CCD, CMOS sensor, etc. is adopted. An address (a position on a photodetection element) of each pixel can be identified, and a field angle (angle of view) of each pixel can be found.

The distance measuring light 6 and the tracking light 25 are projected toward the distance measuring optical axis 30 by the distance measuring optical unit 16, and the reflected distance measuring light 6', the reflected tracking light 25', and the visible light 42 entering the distance measuring optical unit 16 can be separately received and detected.

The main unit controller 19 controls the distance measuring unit 15 and also controls driving units such as a horizontal rotary motor 52 and an elevation rotary motor 57 to be described later. When the fan-shaped distance measuring light 6a is selected for the distance measurement, the distance measuring unit 15 is so controlled that the laser beams 5 for forming reference plane can be projected at the same time as the projection of the fan-shaped distance measuring light 6a, and a distance is measured by receiving the distance measuring light 6' from the object 2 to be measured. An elevation angle is calculated from time difference of the fan-shaped lights when the laser beams 5 for forming reference plane pass through the objects 2 to be measured. A horizontal angle is determined based on a result of detection by the horizontal angle detection encoder 31 when the laser beams 5 for forming reference plane pass through the object 2 to be measured, and a three-dimensional position of the object to be measured 2 is calculated.

When the spot-type distance measuring light 6b is selected for the distance measurement, the distance measurement is performed, and based on a photodetection of the reflection light from the object 2 to be measured, a horizontal angle of the projecting direction is detected by the horizontal angle detection encoder 31, and an elevation angle in the projecting direction is detected by an elevation angle detecting encoder 58 to be described later. Based on the result of the distance measurement, on the horizontal angle, and on the elevation angle thus detected, the three-dimensional position of the object 2 to be measured is calculated.

Now, referring to FIG. 3, a description will be given on the rotator 13.

The rotator 13 is rotatably mounted on the main unit 12 via bearings 51 and 51, and it is designed in such a manner that the rotator 13 is rotated in horizontal direction by a horizontal rotary motor 52.

The rotator 13 comprises a rotary frame 53, the reference plane forming unit 3 mounted on an upper portion of the rotary frame 53, a horizontal rotation axis tilt detecting unit 54 and a rotator cover 50 which is integrated with the rotary frame 53. The rotator cover 50 covers the horizontal rotation axis tilt detecting unit 54, the reference plane forming unit 3 and the rotary frame 53. In the figure, reference numeral 49 denotes a power feeding ring. Via the power feeding ring 49, electric power is supplied from the main unit 12 to the rotator 13.

An elevation rotary mirror 56 is rotatably disposed around an horizontal rotation axis 55 on the rotary frame 53. An elevation rotary motor 57 is provided on one end of the horizontal rotation axis 55, and an elevation angle detecting encoder 58 is provided on the other end of the horizontal rotation axis 55.

A pattern ring 59 of the elevation angle detecting encoder 58 is designed as a reflection mirror similarly to the rotary ring 28. The rotary ring 28 is disposed at a position opposite to the horizontal rotation axis tilt detecting unit 54. A detection light projected from the horizontal rotation axis tilt detecting unit 54 is reflected by the pattern ring 59, and is received by the horizontal rotation axis tilt detecting unit 54. Based on a deviation of the detecting position on the horizontal rotation axis tilt detecting unit 54, the tilting of the horizontal rotation axis 55 is detected. The elevation angle detecting encoder 58 has a reference point, and it is designed as an absolute encoder, which can detect an elevation angle from the reference point.

Figure 4:
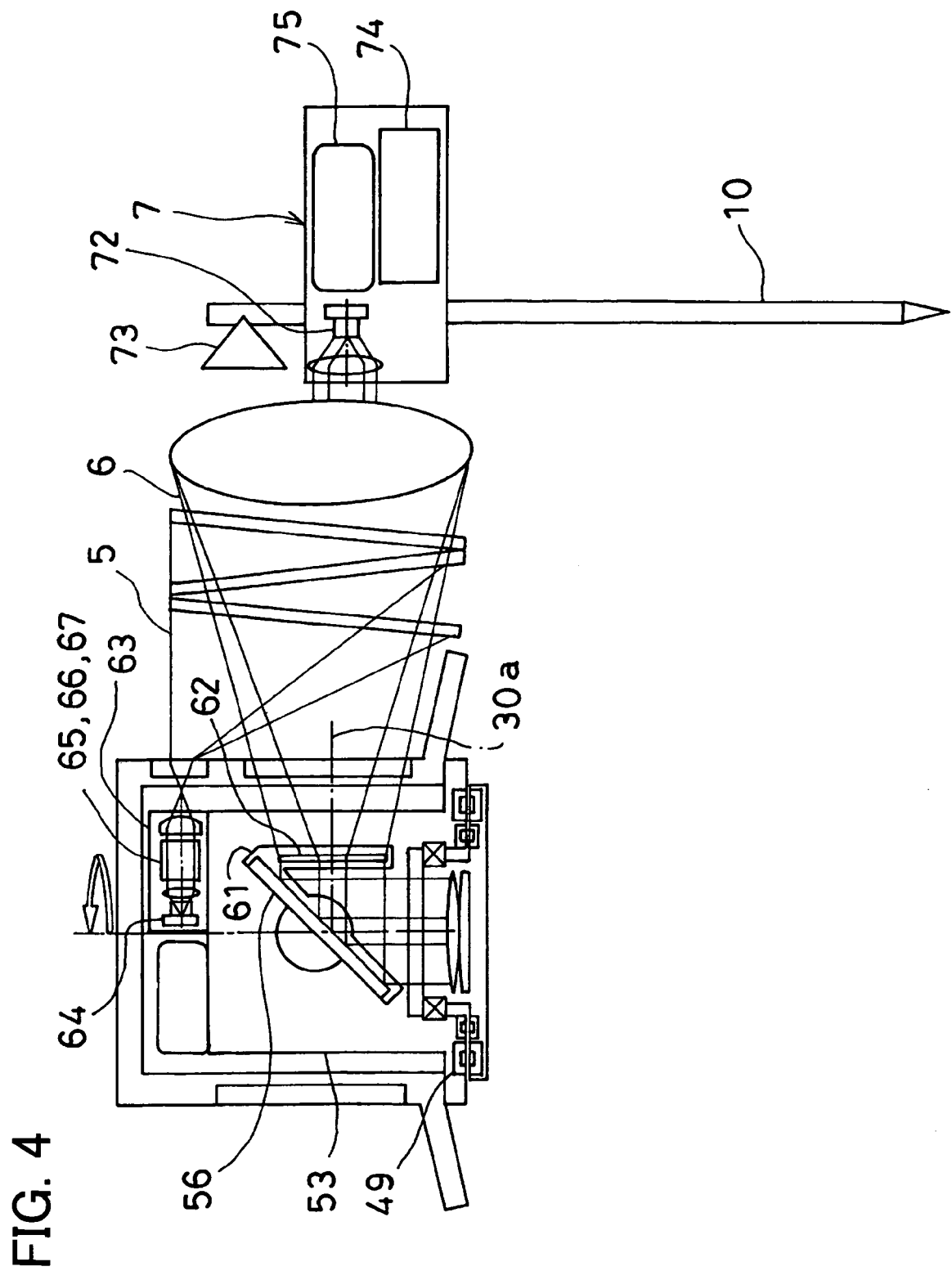
FIG. 4 is a partial view to show a rotating unit of the surveying device according to the present invention.

Referring to FIG. 4, a description will be given on the elevation rotary mirror 56 and a beam extension member disposed on the elevation rotary mirror 56.

Both surfaces of the elevation rotary mirror 56 are designed as reflection surfaces, and the elevation rotary mirror 56 is held on a mirror holder 61. The mirror holder 61 is rotatably mounted on the rotary frame 53 via the horizontal rotation axis 55. A reference position of the elevation rotary mirror 56 is a position tilted by 45° with respect to the distance measuring optical axis 30, which runs in vertical direction, and the distance measuring optical axis 30 is deflected from the elevation direction to the direction of a distance measuring optical axis 30*a*, which runs in horizontal direction.

An extension member 62 to extend the spreading angle in vertical direction of the distance measuring light 6 is held on the mirror holder 61. The extension member 62 is at a position opposite to one surface of the elevation rotary mirror 56, and it is tilted at an angle of 45° with respect to the opposed surface. Accordingly, the extension member 62 runs in a direction perpendicular to the distance measuring optical axis 30.

As the extension member 62, a lenticular lens or a grating member is used.

From the reference position of the elevation rotary mirror 56, the elevation rotary mirror 56 is rotated in elevation direction via the horizontal rotation axis 55 by the elevation rotary motor 57. Thereby, the elevation angle of the projected distance measuring light 6 can be changed. Also, the elevation angle in this case can be detected by the elevation angle detecting encoder 58 (See FIG. 3).

Figure 6:
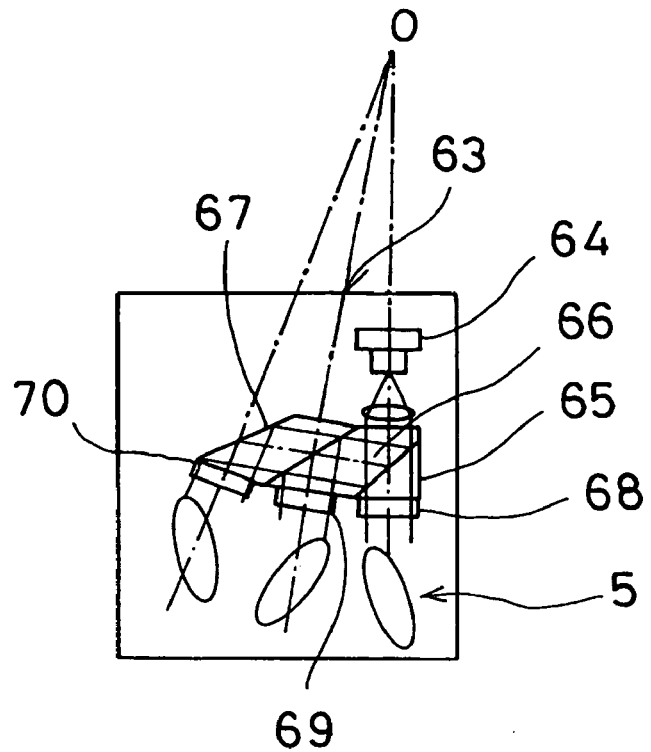
FIG. 6 is an arrow diagram along the arrow A in FIG. 3.

Now, referring to FIG. 6, a description will be given on the reference plane forming unit 3.

The reference plane forming unit 3 comprises a fan-shaped laser beam emitting unit 63 and a mechanism unit for rotatably supporting the fan-shaped laser beam emitting unit 63. The mechanism unit contains the rotary frame 53 rotatably supported and the horizontal rotary motor 52. A projecting direction (horizontal angle) of the laser beams 5 for forming reference plane is detected by the horizontal angle detecting encoder 31. The laser beams 5 for forming reference plane are reflected by the objects 2 to be measured, and the reflected lights are received by a photodetection sensor via the distance measuring optical unit 16. As the photodetection sensor, the tracking light photodetection sensor 44 is used. By detecting a horizontal angle of the horizontal angle detecting encoder 31 at the moment when the tracking light photodetection sensor 44 receives the reflection light of the laser beams 5 for forming reference plane, a horizontal angle of the object 2 to be measured with the surveying device 1 as a reference can be measured.

The fan-shaped laser beam emitting unit 63 comprises a laser beam emitting source 64 for forming reference plane, e.g. LD, splitting prisms 65, 66, and 67, and luminous flux cross-section adjusting members 68, 69 and 70 disposed on exit surfaces of the splitting prisms 65, 66 and 67. As the luminous flux cross-section adjusting members 68, 69 and 70, a cylindrical lens, a diffraction grating, etc. are used. The laser beams emitted from the fan-shaped laser beam emitting unit 63 is split to three portions by the splitting prisms 65, 66 and 67. Further, by the luminous flux cross-section adjusting members 68, 69 and 70, the laser beam cross-section is adjusted to have an elliptical luminous flux cross-section having a cross-sectional longer axis in vertical direction. Three cross-sectional long axes are tilted at a known angle with respect to each other. Optical axes of the fan-shaped laser beams are designed to cross each other at the rotation center O.

Next, referring to FIG. 4, the photodetection device 7 will be described.

The photodetection device 7 is provided at a known position on the pole 10, and the photodetection device 7 primarily comprises a photodetection unit 72 for receiving the laser beams 5 for forming reference plane, a reflector such as a prism 73 for reflecting the distance measuring light 6, a photodetection side communication unit 74 for communicating with the communication unit 21 of the surveying device 1, a photodetection side control arithmetic unit 75, a photodetection side operation unit (not shown), and a photodetection side display unit (not shown).

As communication method of the communication unit 21 and the photodetection side communication unit 74, a method such as radio communication, optical communication, etc. is adopted.

The photodetection side control arithmetic unit 75 calculates an elevation angle based on time difference of photodetection time of each of the fan-shaped laser beams when the photodetection unit 72 receives the laser beams 5 for forming reference plane. The result of the calculation can be transmitted to the surveying device 1 by the photodetection side communication unit 74.

Now, a description will be given on operation.

FIG. 4 shows a case where the multi-measurement is performed. The mirror holder 61 is held in a position that the extension member 62 perpendicularly intercepts the distance measuring optical axis 30a.

Therefore, the distance measuring light 6 is deflected in horizontal direction by the elevation rotary mirror 56. When the distance measuring light 6 passes through the extension member 62, the cross-section of the luminous fluxes is extended in vertical direction and the lights are projected.

At the same time, under the condition that the laser beams 5 for forming reference plane are projected from the fan-shaped laser beam emitting unit 63, the horizontal rotary motor 52 is driven, and the laser beams 5 for forming reference plane and the distance measuring light 6 is projected in rotary irradiation.

Because the laser beams 5 for forming reference plane and the distance measuring light 6 have spreading in vertical direction and are rotated over total circumference, the measurement can be accomplished in wide range, and a plurality of objects 2 to be measured positioned in the range of projection can be measured (see FIG. 1). When a plurality of surveying devices 1 are used at the same time, the laser beams 5 for forming reference plane are differently modulated to prevent radio interference (jamming), and the laser beam can be discriminated on the photodetection device 7 side.

A reflected distance measuring light 6' from the prism 73 is received, and the distances are measured at the distance measuring unit 15. By detecting an angle of the horizontal angle detecting encoder 31 at the moment when the distance measuring light 6' is received, the horizontal angle is measured. The elevation angle measured by the photodetection device 7 is transmitted from the photodetection side communication unit 74, and an elevation angle with respect to the object 2 to be measured can be obtained. From the result of the distance measurement and the elevation angle, a height of the object 2 to be measured can be determined. Accordingly, the three-dimensional data of each of the objects 2 to be measured can be determined.

Figure 7:
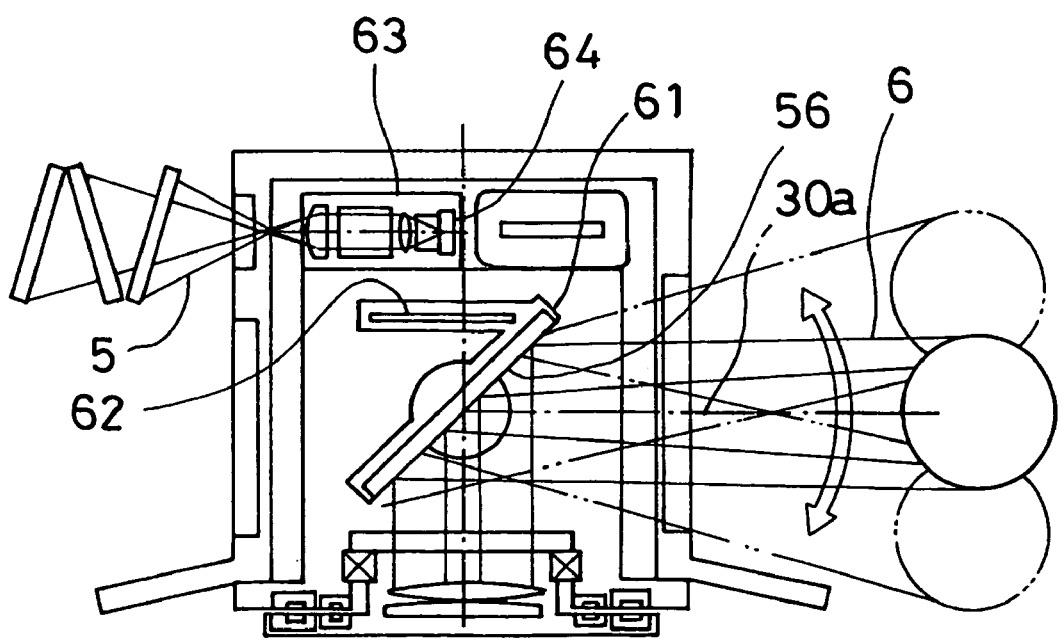
FIG. 7 is a partial view of the rotating unit in a condition that one-man operated measurement is performed by using the surveying device.

FIG. 7 shows a case where the one-man operated measurement is performed.

When measurement operation is shifted from the multi-measurement to the one-man operated measurement, the elevation rotary motor 57 is driven, and the mirror holder 61 is rotated by 90° around the horizontal rotation axis 55.

The extension member 62 is separated from the distance measuring optical axis 30a. As a result, the distance measuring light 6 is projected as a spot light with a narrow beam diameter. To separate the extension member 62 from the optical path of the distance measuring light 6, the mirror holder 61 may be rotated by an angle of 180°. The elevation rotary mirror 56 functions as a means for inserting and removing the extension member 62.

First, as a preparation, the laser beams 5 for forming reference plane are projected from the fan-shaped laser beam emitting unit 63. The horizontal rotary motor 52 is driven, and the laser beams 5 for forming reference plane are projected in rotary irradiation.

An elevation angle is measured by the photodetection device 7 according to time difference of photodetection of two or more fan-shaped laser beams, and the result of measurement is transmitted to the surveying device 1. Upon receipt of the elevation angle from the photodetection device 7, the surveying device 1 calculates a projecting direction of the fan-shaped laser beams by the encoder based on the moment of the receiving of elevation angle data. By coordinating the elevation angle data thus received, a horizontal angle of the photodetection device 7 is calculated. The elevation angle and the horizontal angle may be calculated by the surveying device 7 based on the time of photodetection of the reflection light from the object 2 to be measured.

The distance measuring light 6 and the tracking light 25 are projected from the distance measuring unit 15, and the rotator 13 is rotated by the horizontal rotary motor 52. The mirror holder 61 is rotated by the elevation rotary motor 57, and the projecting direction is directed toward the object 2 to be measured.

When the tracking light 25 catches the object 2 to be measured and the distance measuring light 6 is reflected by the prism 73, the one-man operated distance measurement can be performed. Even when the object 2 to be measured is moved, the object 2 to be measured can be tracked by detecting the reflected tracking light 25'.

A horizontal angle and an elevation angle are measured by the horizontal angle detecting encoder 31 and the elevation angle detecting encoder 58 at the moment when the distance measuring light 6' is detected. Based on the result of the distance measurement, a height of the object 2 to be measured is determined, and the measurement of three-dimensional data of the object 2 to be measured can be accomplished.

For the elevation angle, an elevation angle as obtained by the photodetection device 7 may be used.

In the case of the one-man operated measurement, the distance measuring light 6 has high optical intensity. As a result, the distance measurement can be carried out for long distance. Also, the measurement accuracy is high because the measurement is made by collimating the object 2 to be measured.

Figure 8:
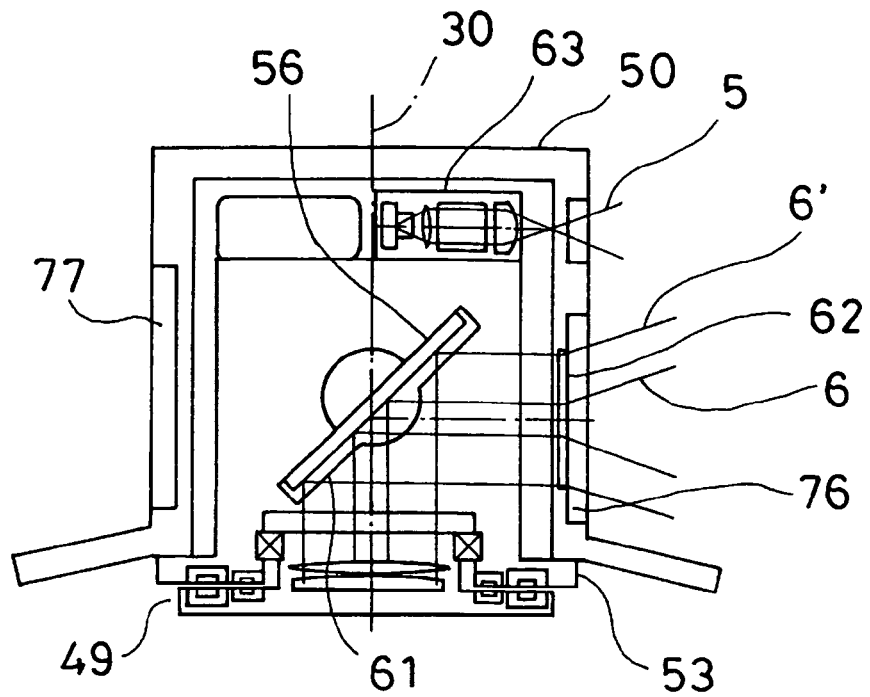
FIG. 8 is a partial view of the rotating unit of another embodiment, showing the rotating unit when one-man operated measurement is performed.
Figure 9:
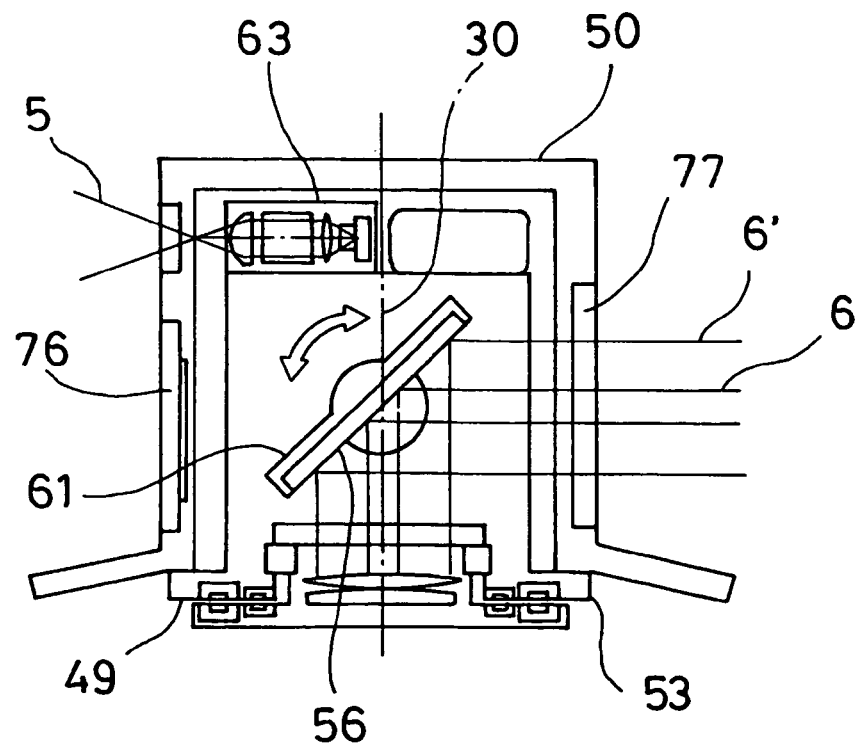
FIG. 9 is a partial view of a still another embodiment, showing the rotating unit when one-man measurement is performed.

FIG. 8 and FIG. 9 each represents another embodiment.

In these embodiments, the extension member 62 is provided on a rotator cover 50.

At a position of 180° from the distance measuring optical axis 30 on the rotator cover 50, a transmission portion, e.g. transmission windows 76 and 77, are disposed. On one of the transmission windows, i.e. on a transmission window 76, the extension member 62 is mounted. And on the other transmission window, i.e. on the transmission window 77, a mere glass window is mounted, thus, the transmission window 77 fulfills no optical function.

Under the condition that the reflection surface of the elevation rotary mirror 56 is disposed at a position opposite to the extension member 62, (FIG. 8), the distance measuring light 6 passes through the extension member 62. The cross-section of luminous fluxes is extended in vertical direction, and the multi-measurement can be performed.

Next, when the elevation rotary mirror 56 is rotated by an angle of 90°, the reflection surface comes to a position opposite to the transmission window 77, and the distance measuring light 6 is projected by passing through the transmission window 77. Because the extension member 62 is not provided on the transmission window 77, the configuration of the beams of the distance measuring light 6 can be maintained. The lights are projected with high optical intensity while maintaining luminous fluxes with small diameter. Thus, the one-man operated measurement can be performed, and distance measurement can be made for long distance.

As a variation of the other embodiment, the extension member 62 is disposed on the transmission window 76 of the rotator cover 50, and the rotator cover 50 is designed to rotate with respect to the rotary frame 53. Then, the rotator cover 50 and an actuator for rotating the rotator cover 50 function as a means for inserting and removing the extension member 62.

Without rotating the elevation rotary mirror 56 by an angle of 90°, if the rotator cover 50 is relatively rotated with respect to the rotary frame 53 and the positions of the transmission window 76 and the transmission window 77 are changed, the fan-shaped distance measuring light 6 spread in vertical direction for the multi-measurement and the spot-type distance measuring light 6 for the one-man operated measurement can be switched over to each other.

Further, the extension member 62 is not necessarily disposed on the rotator 13, and it will suffice if the extension member 62 is arranged in such a manner that it is possible to insert and remove in the optical path of the distance measuring light 6.

Also, in case where the elevation angle is not measured in the multi-measurement, the reference plane forming unit 3 for projecting the fan-shaped beam may not be used.

Further, as for the spreading angle of the fan-shaped distance measuring light 6a, it may be so designed that a plurality of the extension members 62 are disposed to have a plurality of different spreading angles, that the extension member 62 is selected depending on the distance, and that the fan-shaped distance measuring light 6a with adequate spreading angle is projected.

For instance, the elevation rotary mirror 56 may be designed to have three reflection surfaces, and the extension members with different spreading characteristics are provided on the two reflection surfaces. Then, by switching over the reflection surfaces of the elevation rotary mirror 56, the spreading angle of the distance measuring light to pass through the extension member can be changed. Or, transmission windows may be provided in three parts at an angle of 120° on the rotator cover 50 as shown in FIG. 8. Then, the extension members having different spreading characteristics are provided on the two transmission windows, and the extension members are relatively rotated at every 120° with respect to the elevation rotary mirror 56 so that an extension member 62 where the distance measuring light passes through can be selected.

Further, it may be so designed that the fan-shaped distance measuring light 6a, being spread by the extension member, is rotated in vertical direction by the driving of the elevation rotary mirror 56. That is, by stopping the elevation rotary mirror 56 at an arbitrary position in an elevation direction, the projecting direction (i.e. directivity) of the fan-shaped distance measuring light 6a can be changed.

As a result, even when the fan-shaped distance measuring light 6a with a spreading angle narrower than the spreading angle of the laser beams 5 for forming reference plane is used, the distance can be measured in the range of the elevation angle detected by using the laser beams 5 for forming reference plane, and the spreading angle of the fan-shaped distance measuring light 6a can be made smaller and the distance can be measured for longer distance.

The invention claimed is:

1. A surveying device, comprising a rotator for deflecting a distance measuring light in horizontal direction and for projecting said distance measuring light in rotary irradiation, at least one extension member for increasing a spreading angle in vertical direction of said distance measuring light, and a means positioning said extension member so that said extension member can be inserted in and removed from a distance measuring optical axis, wherein the distance measuring light with a small spreading angle in vertical direction is projected in rotary irradiation when said extension member is removed, and the distance measuring light with a large spreading angle in vertical direction is projected in rotary irradiation where said extension member is inserted.

2. A surveying device according to claim 1, wherein said rotator has an elevation rotary mirror for deflecting said distance measuring optical axis in horizontal direction, said elevation rotary mirror is rotatable around a horizontal axis, said elevation rotary mirror has a plurality of reflection surfaces, at least one extension member is disposed opposite to one surface of said elevation rotary mirror and is rotatable integrally with said elevation rotary mirror, and when said distance measuring optical axis is deflected by one surface of said elevation rotary mirror, said distance measuring light pass through said extension member.

3. A surveying device according to claim 1, wherein said rotator has said elevation rotary mirror for deflecting said distance measuring optical axis in horizontal direction, and said distance measuring light is projected via an optical path where at least one of said extension members is provided to allow said distance measuring light to pass through.

4. A surveying device according to claim 3, wherein said elevation rotary mirror is rotated around the horizontal axis, and an optical path is selected where said distance measuring light is projected.

5. A surveying device according to claim 3, wherein said extension member is held by an extension member holding unit with respect to said elevation rotary mirror, said extension member holding unit is rotated around an elevation axis, and an optical path is selected wherein said distance measuring light is projected.

6. A surveying device, comprising a light source for emitting a distance measuring light, a distance measuring light projecting unit for projecting said distance measuring light from said light source as a spot-type distance measuring light or as a fan-shaped distance measuring light toward a space where an object to be measured is present, a fan-shaped beam rotary projecting unit for projecting two or more fan-shaped beams, with at least one fan-shaped beam being tilted, in rotary irradiation, a horizontal angle detecting unit for detecting a horizontal angle in a projecting direction of said fan-shaped beams or said distance measuring light, an elevation angle detecting unit for detecting an elevation angle in a projecting direction of said spot-type distance measuring light or for detecting an elevation angle by a fan-shaped beam receiving unit, a distance measuring unit for measuring a distance to said object to be measured by receiving a reflected distance measuring light from said object to be measured, a reflected fan-shaped beam receiving unit for receiving a reflection light of said fan-shaped beams reflected from said object to be measured, a distance measuring light switchover unit for selecting one of said spot-type distance measuring light or said fan-shaped distance measuring light projected from said distance measuring light projecting unit, and an arithmetic unit for calculating a three-dimensional position of said object to be measured based on a result of the distance measurement by said distance measuring unit, on a result of detection by said horizontal angle detecting unit, and on a result of detection by said elevation angle detecting unit.

7. A surveying device according to claim 6, wherein said distance measuring light switchover unit has an extension member for increasing a spreading angle in vertical direction of said distance measuring light and a means for positioning said extension member so that said extension member can be inserted in and removed from a distance measuring optical axis.

8. A surveying device according to one of claims 1 to 3 and 7, wherein said extension member is a lenticular lens.

9. A surveying device according to one of claims 1 to 3 and 7, wherein said extension member is a grating member.

10. A surveying device according to claim 2 or 3, wherein, when said extension member is removed, said elevation rotary mirror is rotated further in vertical direction and deflects said distance measuring optical axis.

11. A surveying device according to claim 2 or 3, wherein said extension member can be selected from a plurality of extension members with different spreading angles in vertical direction of said distance measuring light.

12. A surveying system, comprising a surveying device and an object to be measured, wherein said surveying device comprises a distance measuring light projecting unit for projecting a spot-type distance measuring light or a fan-shaped distance measuring light toward an object to be measured, a distance measuring light projecting direction detecting unit for detecting a projecting direction by said distance measuring light projecting unit, a distance measuring light receiving unit for receiving said spot-type distance measuring light or said fan-shaped distance measuring light reflected from said object to be measured, a fan-shaped beam rotary projecting unit for projecting two or more fan-shaped beams, with at least one fan-shaped beam being tilted, in rotary irradiation, a fan-shaped beam projecting direction detecting unit for detecting a projecting direction of said fan-shaped beams, a first communication unit, a distance measuring light switchover unit for switching over said spot-type distance measuring light and said fan-shaped distance measuring light, an arithmetic unit, and wherein said object to be measured comprises a reflector for reflecting the distance measuring light projected from said distance measuring light projecting unit, a fan-shaped beam receiving unit for receiving said fan-shaped beams from said fan-shaped beam rotary projecting unit, a second communication unit for performing communication by giving and taking a signal including a signal from said fan-shaped beam receiving unit to and from said first communication unit, Wherein said arithmetic unit calculated a three-dimensional position of said object to be measured based on signals from said distance measuring light projecting direction detecting unit and from said distance measuring light receiving unit when said spot-type measuring light is selected, And wherein said arithmetic unit calculated a three-dimensional position of said object to be measured based on signals from said fan-shaped beam projecting direction detecting unit and/or said distance measuring light projecting direction detecting unit, or signals from said distance measuring light receiving unit, and or a signal from said second communication unit, which is received at said first communication unit.

13. A surveying system according to claim 12, wherein said distance measuring light switchover unit comprises an extension member for increasing a spreading angle in vertical direction of said distance measuring light, and a means for positioning said extension member so that said extension member can be inserted in and removed from a distance measuring optical axis.

14. A surveying system according to claim 12, wherein said extension member is a lenticular lens.

15. A surveying system of claim 12, wherein said extension member is a grating member.

16. The surveying device of claim 2, wherein said extension member is inserted in said distance measuring optical axis after said elevation rotary mirror deflects said distance measuring axis in said horizontal direction.

* * * * *